Feb. 5, 1935.  A. V. FRIEDOLSHEIM ET AL  1,990,229
OXIDATION OF HYDROCARBONS
Filed Aug. 16, 1932
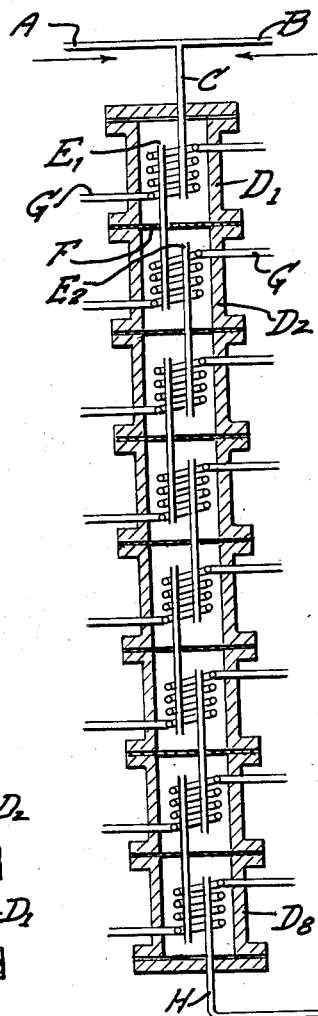
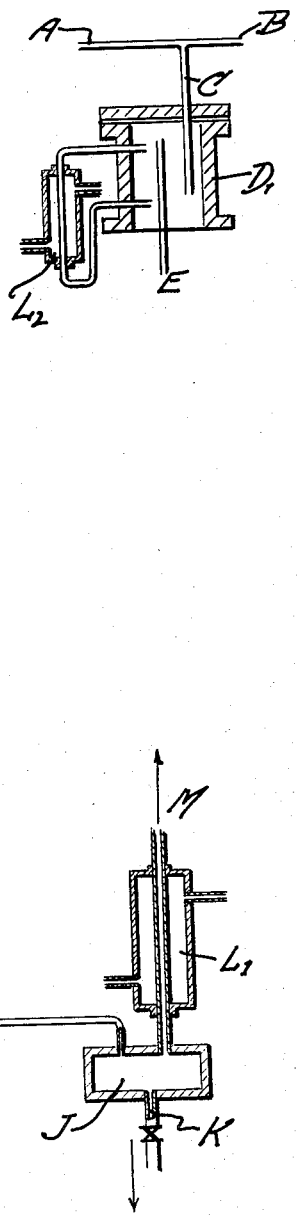
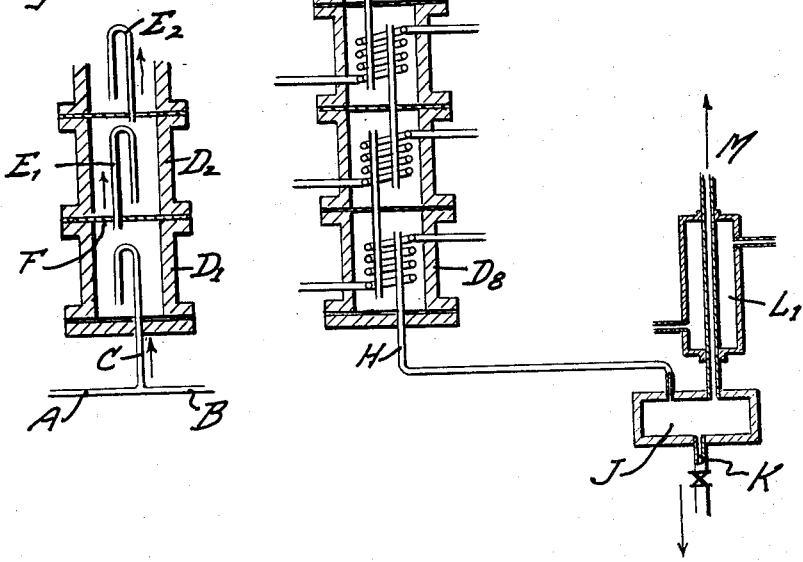
INVENTORS
ADOLF v. FRIEDOLSHEIM
MARTIN LUTHER.
BY
ATTORNEYS.

Patented Feb. 5, 1935

1,990,229

UNITED STATES PATENT OFFICE 1,990,229

OXIDATION OF HYDROCARBONS

Adolf v. Friedolsheim, Ludwigshafen-on-the-Rhine, and Martin Luther, Mannheim, Germany, assignors to I. G. Farbenindustrie Aktiengesellschaft, Frankfort - on - the - Main, Germany Application August 16, 1932, Serial No. 629,006
In Germany August 18, 1931

2 Claims. (Cl. 260—116)

The present invention relates to improvements in carrying out chemical reactions between liquids and gases or vapors, in particular the oxidation in the liquid phase with gaseous oxidizing agents of hydrocarbons, and apparatus therefor.

In order to cause liquids to react with gases or vapors a process has already been proposed according to which the liquids are introduced together with the gases into the bottom of a vessel provided with filling bodies. After causing them to froth in the interior of the vessel they are withdrawn from the upper part, usually after separating them from the gases. The liquids may be led several times in circulation through the same vessel or through several reaction vessels arranged one behind another while introducing fresh gases at or near the inlet for the liquid. The said process is used especially for the oxidation in the liquid phase of fused paraffin wax with air which takes place at temperatures between 100° and 220° C., for hydrogenations of unsaturated organic compounds, chlorinations and mainly for processes in which an intimate and uniform mixing of the reaction components is desired. In order to obtain an intimate contact of the gases with the vapors and to produce the desired frothing it is frequently necessary to work with a powerful current of gas, i. e. with large quantities of gas exceeding those required for the reaction. This necessitates a considerable expenditure of energy for the movement of the gas.

We have now found that the said processes are advantageously carried out by leading the liquids under conditions of temperature and pressure at which the reaction is known to take place in the same direction as the gases or vapors (hereinafter collectively referred to as "vaporized substances") through a column consisting of two or more chambers arranged one above the other in such a manner that no reflux of liquid takes place from one chamber into the preceding chamber. Whenever in the following gases are referred to it is to be understood that vapors may be employed with the same success. The gas and the liquid are preferably introduced together at the top of the column in such a manner that the reaction components bubble slowly through the single chambers from the bottom to the top of each chamber. The gas and the liquid are preferably passed together from one chamber to the next lower during their flow through the column. The separation of the gas from the liquid does not take place until their exit from the last chamber i. e. not until after the entire completion of the reaction. It is a considerable advantage of the process according to the present invention that the gases are used up much better than in other processes. For example only a half or a third of the oxygen necessary for the oxidation of hydrocarbons in other processes need be employed according to the present invention.

In the process according to the present invention it is especially advantageous to employ the vaporized substances which are to be caused to react with liquids diluted with inert gases; the latter bubble through the liquid and cause a sufficient degree of frothing even after the reacting vaporized substances have been partly or wholly consumed by the reaction. This method of working is especially suitable in cases when reaction products which have already been formed are liable to enter readily into reaction with the vaporized substances during the prolonged treatment of the unconverted liquid or when they are changed in an undesirable manner, as for example in the destructive oxidation of waxes, such as paraffin wax, or of middle oils. Thus the liquids meet with conditions which become more mild during their flow through the column because by reason of the consumption of reacting vaporized substance they enter into reaction with a vaporized substance which in the case of the employment of additions of inert gases becomes more and more dilute by the decreasing percentage of reacting vaporized substances, and in some cases to a small degree by the formation of non-reacting gases in the reaction as for example by the formation of small amounts of carbon dioxide in the oxidation of paraffin wax by which a dilution and thereby a far-reaching protection of the reaction material takes place. Frequently it is preferable to employ diluted reacting gases as they are conveniently available, as for example air for the oxidation of hydrocarbons.

The processes may be carried out under elevated pressure. A fall in pressure extending over the single chambers is caused by the weight of the column of liquid.

The nature of the present invention will be further described with reference to the accompanying drawing which illustrates arrangements of apparatus according to this invention and by the following examples, but the invention is not restricted to the particular arrangements shown or to these examples. Figure 1 of this drawing represents in a somewhat diagrammatic manner a vertical section of a preferred form of apparatus. Figures 2 and 3 show vertical sections of modified forms of chambers of which the apparatus may be built up.

Referring to Figure 1, A is a pipe through which the liquid (or molten) initial material and B is a pipe through which the vaporized reaction components are passed into a pipe C in which the components are allowed to mix. The end of the pipe C is not far from the bottom of the first reaction chamber $D_1$ of the column so that the reaction mixture enters this chamber near the bottom. $E_1$ is an overflow-pipe connecting the chamber $D_1$ with the second reaction chamber $D_2$ which two chambers are separated by a separating bottom plate F. The distance of the upper end of the pipe $E_1$ from the top of the chamber $D_1$ determines the amount to which the chamber $D_1$ is filled with the reaction mixture. Any material in excess of this amount flows through the pipe $E_1$ down to the chamber $D_2$. The lower end of the pipe $E_2$ in the chamber $D_2$ corresponds to the lower end of the pipe C in the chamber $D_1$. The other chambers are constructed similar to the chambers $D_1$ and $D_2$. The overflow-pipe H of the last chamber $D_8$ leads to a separator J serving for the separation of the liquid reaction products which may be withdrawn through a pipe K while the gases are freed from condensable constituents in the condenser $L_1$ and then escape through pipe M. Coils G may be provided for heating or cooling the reaction chambers.

The heating or cooling may be effected by surrounding the whole apparatus with a heating or cooling jacket instead of by providing coils. It is also possible to keep the single chambers at different temperatures, for example by branching off a part of the reaction material, leading it through a cooling or heating member arranged outside the chamber concerned and then leading it back into the chamber again. This manner of working may be carried out by means of an arrangement as shown in Figure 2, where $L_2$ is the cooling or heating member while the other letters have the similar significance to that described with reference to Figure 1.

The flow of the mixture through the column may also take place upwards by means of a corresponding modification of the inlets and outlets of the chambers. This arrangement is shown in Figure 3. The modified pipes C, $E_1$, $E_2$ allow the reaction mixture to pass through the chambers in upward direction.

*Example 1*

The oxidation of paraffin wax with air may be carried out in this apparatus in the following manner. Fused paraffin wax is passed through the pipe A while 200 liters of air per hour and kilogram of paraffin wax are passed through the pipe B. The mixture of air and paraffin wax is introduced by the pipe C into the chamber $D_1$, which is heated by means of superheated steam being under a pressure of 6 atmospheres above atmospheric pressure and which flows through the coil G to about 160° C. In the interior of the chamber $D_1$, the oxidation begins and the reaction mixture froths. In the treatment of other materials which have not themselves the property of foaming, it is advantageous to cause frothing by providing suitable distributing devices such as rings or sieve plates. The reaction mixture is passed from chamber to chamber, the heat being regulated by means of the medium flowing through the coils G. From the last chamber the reaction products pass through the pipe H to the separator J. The liquid product having been treated in the column for about 5 hours is withdrawn through the pipe K. It has an acid value of 100 and a saponification value of 150; it consists to the extent of about 75 per cent of oxygen-containing compounds, namely carbonic acids, wax alcohols which are to a great extent esterified with the said acids, the remainder being unconverted material. The product may be worked up in any known manner. The waste gas containing from about 6 to 8 per cent of oxygen is passed through the condenser where the oxidation products carried away by the waste gases are condensed. The non-condensable gases escape through M.

*Example 2*

Soya bean oil having an iodine value of 130 with an addition of 0.3 per cent of a nickel catalyst supported in fine division on diatomaceous earth is continuously fed in through the pipe A (see Figure 1) while hydrogen is passed into the pipe B under a pressure of 5 atmospheres above atmospheric pressure. The reactants are allowed to mix in the pipe C, by which they enter into the column. The reaction mixture passes through the chambers $D_1$, $D_2$, etc., maintained at a temperature of 180° C., while the reaction proceeds, and is then discharged through the pipe H into the separator J. The liquid product is continuously withdrawn through the pipe K. After passing through a filter-press (not shown) it has an iodine value of 32. Any liquid product carried over by the gas is condensed in the condenser $L_1$. The unconsumed hydrogen is withdrawn through M and recycled to the pipe B by means of a pump, the consumed quantity of hydrogen being replaced by fresh gas. Instead of hydrogen a mixture of nitrogen and hydrogen may be used. In this case such a quantity of hydrogen may be employed that it is totally consumed so that only nitrogen escapes through the pipe M.

*Example 3*

This example is with reference to the arrangement shown in Figure 3. Fatty acid from olive oil having an acid number of 180 is introduced into pipe A while vapors of glycerol are supplied by pipe B. The acid and the glycerol combine in pipe C and from thence are passed into the lowest chamber of the apparatus while heated to 230° C. and evacuated. The water vapor formed by the esterification as well as the excess of vapors of glycerol escape from the uppermost chamber together with the liquid triglyceride and are then separated from the latter. The vapors of glycerol and the water vapor are fractionally condensed or employed for conversion with further amounts of fatty acid. (The initial glycerol need not be free from water). The triglyceride has an acid number of 3.2 and may be further worked up in the usual manner.

*Example 4*

This example is with reference to Figure 1. Acetaldehyde to which 0.1 per cent of its weight of manganese acetate has been added is introduced by pipe A while oxygen is supplied by pipe B in an amount about equal to that stoichiometrically required for the conversion of the acetaldehyde into acetic acid. The chambers which are all filled with acetic acid are kept at a temperature between 50° and 60° C. The velocity of the gases is so regulated that the reaction is practically complete when the gases enter the last chamber. At M scarcely any gases escape. The acetic acid formed continuously flows off at K.

The single chambers are preferably filled with filling bodies, as for example indifferent or catalytically acting shaped bodies, not subject to alteration in shape, if desired projecting beyond the liquid surface, or provided with suitable insertions causing an intensive long lasting contact of the reactants, such as deflecting capsules, baffle plates or trays and the like. Furthermore filling bodies having catalytic action may be employed or catalysts may be dissolved or suspended in the liquids to be treated. In the case of the oxidation of waxes, such as paraffin wax, substances containing manganese, in the case of the oxidation of middle oils substances containing aluminium, in hydrogenating reactions substances containing nickel may be employed as suitable filling materials exerting a catalytic action. Suitable catalysts for the oxidation of paraffin wax are solutions of alkali metal carbonates and alkali metal hydroxides, soaps of the alkali and alkaline earth metals, and the like.

The liquids to be treated may also be mixed with assistant liquids acting catalytically or moderating the intensity of the reaction or intercepting the reaction products. For example in the case of the oxidation of paraffin wax soda solution or in the case of the oxidation of benzine acetic acid may be employed as assistant liquids. If desired these assistant liquids may be introduced in stages into the single chambers. Moreover the gaseous or vaporous substances having a catalytic action such as ammonia, steam or vapors of acetic acid may be supplied to the gas to be reacted before its entry into the apparatus or at one or more places in the column.

In order to obtain a better utilization of heat, a regenerator may be inserted between H and J in which the gas to be employed and the liquid to be reacted may be preheated.

What we claim is:

1. A process for the oxidation in the liquid phase of a paraffinic hydrocarbon with a gas comprising free oxygen which comprises passing said paraffinic hydrocarbon while in the liquid state concurrently with said gas at a temperature between 100° and 220° C. successively through at least two separate spaces situated one above the other in such a manner that in each of the said spaces a bulk of said liquid hydrocarbon is maintained through which the said gas bubbles and from which the gas while flowing to the next following of the said spaces continuously carries off a portion, and avoiding a reflux of the hydrocarbon liquid from one of said spaces to the next preceding one.

2. A process for the oxidation in the liquid phase of fused paraffin wax with air which comprises passing said fused wax together with air at a temperature between 100° and 220° C. successively through at least two separate spaces situated one above the other in such a manner that in each of the said spaces a bulk of said fused wax is maintained through which the air bubbles and from which the air while flowing to the next following of the said spaces continuously carries off a portion, and avoiding a reflux of the fused wax from one of said spaces to the next preceding one.

ADOLF v. FRIEDOLSHEIM.
MARTIN LUTHER.